(12) United States Patent
Kudo et al.

(10) Patent No.: US 11,173,420 B2
(45) Date of Patent: Nov. 16, 2021

(54) WATER ABSORBING AND RELEASING BODY FOR ENGINE OIL, AUTOMOTIVE PARTS INCLUDING WATER ABSORBING AND RELEASING BODY, AND METHOD FOR PRODUCING WATER ABSORBING AND RELEASING BODY FOR ENGINE OIL

(71) Applicants: NISSAN CHEMICAL INDUSTRIES, LTD., Tokyo (JP); TOYOTA JIDOSHA KABUSHIKI KAISHA, Toyota (JP); TOYOTA BOSHOKU KABUSHIKI KAISHA, Kariya (JP)

(72) Inventors: Yoshihiro Kudo, Funabashi (JP); Ippei Fukutomi, Toyota (JP); Yasuhiro Shimakura, Kariya (JP); Yoji Horiuchi, Kariya (JP)

(73) Assignees: NISSAN CHEMICAL INDUSTRIES, LTD., Tokyo (JP); TOYOTA JIDOSHA KABUSHIKI KAISHA, Toyota (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 245 days.

(21) Appl. No.: 15/886,294

(22) Filed: Feb. 1, 2018

(65) Prior Publication Data

US 2018/0264380 A1 Sep. 20, 2018

(30) Foreign Application Priority Data

Mar. 17, 2017 (JP) .............................. JP2017-053560

(51) Int. Cl.
*B01D 17/02* (2006.01)
*C02F 1/68* (2006.01)
(Continued)

(52) U.S. Cl.
CPC ..... *B01D 17/0214* (2013.01); *B01D 17/0202* (2013.01); *B01D 35/005* (2013.01);
(Continued)

(58) Field of Classification Search
CPC ...................... B01D 17/0214; B01D 17/0202; B01D 15/00; B01D 35/005; B01D 29/0095;
(Continued)

(56) References Cited

U.S. PATENT DOCUMENTS 5,599,335 A * 2/1997 Goldman ................ A61L 15/42
604/368
2001/0049413 A1* 12/2001 Haraguchi ............... C08J 3/075
524/446
(Continued)

FOREIGN PATENT DOCUMENTS

CN 102995493 B 12/2014
CN 106245447 A 12/2016
(Continued)

OTHER PUBLICATIONS

May 7, 2021 Office Action issued in Chinese Application No. 201810217457.6.

*Primary Examiner* — Katherine Zalasky McDonald
(74) *Attorney, Agent, or Firm* — Oliff PLC

(57) ABSTRACT

A water absorbing and releasing body that absorbs water in engine oil and releases water when the temperature of the engine oil is high in order to maintain the performance of the engine oil, automotive parts including the water absorbing and releasing body, and a method for producing the water absorbing and releasing body for engine oil.

7 Claims, 2 Drawing Sheets

(51) Int. Cl.
- *B01D 35/00* (2006.01)
- *B01J 20/22* (2006.01)
- *B01J 20/26* (2006.01)
- *C08L 101/14* (2006.01)
- *B01J 20/10* (2006.01)
- *B01J 20/12* (2006.01)
- *C08L 33/02* (2006.01)

(52) U.S. Cl.
CPC ............. *B01J 20/10* (2013.01); *B01J 20/12* (2013.01); *B01J 20/22* (2013.01); *B01J 20/261* (2013.01); *C02F 1/681* (2013.01); *C08L 33/02* (2013.01); *C08L 101/14* (2013.01); *B01J 2220/46* (2013.01)

(58) Field of Classification Search
CPC .... B01D 29/018; B01D 29/05; B01D 29/055; B01D 29/50; B01D 29/56; B01J 20/10; B01J 20/12; B01J 20/22; B01J 20/261; B01J 20/28023; B01J 20/28016; B01J 20/28026; B01J 20/32; B01J 20/3206; B01J 20/3208; B01J 20/3231; B01J 20/3234; C02F 1/681; C02F 1/28; C02F 1/281; C02F 1/285; C02F 1/288; C08L 33/02; C08L 101/14

See application file for complete search history.

(56) References Cited

U.S. PATENT DOCUMENTS

| | | | |
|---|---|---|---|
| 2003/0047504 A1* | 3/2003 | Scheper | B01J 20/103 |
| | | | 210/435 |
| 2016/0272806 A1 | 9/2016 | Kudo et al. | |
| 2017/0009024 A1* | 1/2017 | Kudo | A61K 8/345 |

FOREIGN PATENT DOCUMENTS

| | | |
|---|---|---|
| GN | 105705584 A | 6/2016 |
| JP | H02-133407 A | 5/1990 |
| JP | 2005-009378 A | 1/2005 |
| WO | 2015/125968 A1 | 8/2015 |
| WO | 2016/063836 A1 | 4/2016 |

\* cited by examiner

WATER ABSORBING AND RELEASING BODY FOR ENGINE OIL, AUTOMOTIVE PARTS INCLUDING WATER ABSORBING AND RELEASING BODY, AND METHOD FOR PRODUCING WATER ABSORBING AND RELEASING BODY FOR ENGINE OIL

TECHNICAL FIELD

The present invention relates to a water absorbing and releasing body for engine oil, automotive parts including the water absorbing and releasing body for engine oil, and a method for producing a water absorbing and releasing body for engine oil. More specifically, the present invention relates to a water absorbing and releasing body that absorbs water in engine oil and releases water when the temperature of the engine oil is high in order to maintain the performance of the engine oil, automotive parts including the water absorbing and releasing body, and a method for producing a water absorbing and releasing body for engine oil.

BACKGROUND ART

In the engine of an automobile, water vapor is generated by combustion of fuel and a part of the water vapor is mixed into engine oil. Existence of water in engine oil may cause trouble such as corrosion inside the engine or deterioration of the engine oil. Consequently, a method for effectively removing water from engine oil has been required. In what is called a hybrid electric vehicle (HEV) including an engine and an electric motor, of which the market has been expanding in recent years, the engine oil has difficulty in removing water in the engine oil by evaporation since the engine oil is maintained at relatively low temperature, compared with the engine oil in the engine of a common automobile powered by an engine alone. Therefore, residual water in the engine oil and white turbidity of the engine oil caused by the residual water have been significant problems.

As a method for removing water from engine oil in an engine, an oil filter with a water absorption mechanism characterized in that the water absorption mechanism that can absorb the water mixed in the engine oil is included has been developed (Patent Document 1). This water absorption mechanism is configured by, for example, a container, a granular or powdery superabsorbent polymer, and a nonwoven fabric. The superabsorbent polymer is contained in the container and the upper part of the container is covered with the nonwoven fabric in order to prevent the superabsorbent polymer from mixing into the engine oil.

The above-described superabsorbent polymer is widely used for the water absorption material of sanitary products, disposable diapers, and the like. Various water absorption materials other than the superabsorbent polymer have been developed. For example, a gel that includes a water-soluble organic macromolecule, a silicate, and a dispersant of the silicate and from which a solvent in the gel is removed has been reported (Patent Document 2).

A hydrogel formed body having an excellent water absorbing property and water releasing property, including a water-soluble organic macromolecule, a silicate, and a dispersant of the silicate, and further having cracks on the surface of the gel has been reported (Patent Document 3).

PRIOR ART DOCUMENTS

Patent Documents

Patent Document 1: Japanese Utility Model Application Publication No. H02-133407
Patent Document 2: WO 2015/125968
Patent Document 3: WO 2016/063836

SUMMARY OF THE INVENTION

Problems to be Solved by the Invention

The oil filter having the water absorption mechanism described in Patent Document 1 may cause breakage of the nonwoven fabric for preventing the granular or powdery superabsorbent polymer from mixing into the engine oil by long period use and thus the superabsorbent polymer may run out into the engine oil because the temperature of the engine oil in the oil filter becomes 80° C. or higher and the flow rate becomes 10 liter per minute or higher during driving. When the granular or powdery substance runs out into the engine oil, clogging of the oil filter and wear of sliding parts may occur and thus the engine may break down.

The gel described in Patent Document 2 is formed in order to develop desired strength by removing the solvent in the gel to adjust a solid content. Therefore, Patent Document 2 does not suggest efficient means of effectively absorbing and releasing water in engine oil.

The hydrogel formed product described in Patent Document 3 has the porous structure and thus water or a water-containing liquid can be retained inside the gel and can release the water or the water-containing liquid through the cracks. This hydrogel formed product is suitable for an application as a carrier for plant growth as a soil replacement product, utilizing its characteristics. Therefore, Patent Document 3 also does not suggest efficient means of selectively absorbing water in engine oil and releasing the absorbed water.

The present invention has been made in view of the above circumstances and an object of the present invention is to provide a water absorbing and releasing body that can absorb water in engine oil under harsh environment in an oil filter, can release water when the temperature of the engine oil is high, can be processed into a film or a sheet, and can be used without being covered with a nonwoven fabric and the like, automotive parts including the water releasing and absorbing body, and a method for producing the water releasing and absorbing body.

Means for Solving the Problem

As a result of extensive studies to solve the problems, the inventors of the present invention have found out that a water absorbing and releasing body formed by including a water-soluble organic macromolecule, a silicate, and a dispersant of the silicate can effectively and selectively absorb water in engine oil under harsh environment in an oil filter, can release the water when the temperature of the engine oil is high, is durable for deformation such as folding, can be processed by a cutting process, and can be used without being covered with a nonwoven fabric and the like and thus have accomplished the present invention.

More specifically, as a first aspect, the present invention relates to a water absorbing and releasing body for engine oil comprising: a water-soluble organic macromolecule (A), a silicate (B), and a dispersant (C) for the silicate. As a second aspect, the present invention relates to the water absorbing and releasing body for engine oil according to the first aspect, in which the water-soluble organic macromolecule (A) is a fully neutralized or partially neutralized polyacrylate having a weight average molecular weight of 1,000,000 to 10,000,000.

As a third aspect, the present invention relates to the water absorbing and releasing body for engine oil according to the first aspect or the second aspect, in which the silicate (B) is at least one of water-swellable silicate particles selected from the group consisting of smectite, bentonite, vermiculite, and mica.

As a fourth aspect, the present invention relates to the water absorbing and releasing body for engine oil according to any one of the first aspect to the third aspect, in which the dispersant (C) is at least one substance selected from the group consisting of a fully neutralized salt or partially neutralized salt of orthophosphoric acid, a fully neutralized salt or partially neutralized salt of pyrophosphoric acid, a fully neutralized salt or partially neutralized salt of tripolyphosphoric acid, a fully neutralized salt or partially neutralized salt of tetraphosphoric acid, a fully neutralized salt or partially neutralized salt of hexametaphosphoric acid, a fully neutralized salt or partially neutralized salt of polyphosphoric acid, a fully neutralized salt or partially neutralized salt of etidronic acid, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

As a fifth aspect, the present invention relates to the water absorbing and releasing body for engine oil according to any one of the first aspect to the fourth aspect, further comprising a water-absorbing macromolecule (D).

As a sixth aspect, the present invention relates to the water absorbing and releasing body for engine oil according to the fifth aspect, in which the water-absorbing macromolecule (D) is at least one substance selected from the group consisting of a crosslinking-type polyacrylate and a crosslinking-type polyvinylsulfonate.

As a seventh aspect, the present invention relates to the water absorbing and releasing body for engine oil according to any one of the first aspect to the sixth aspect, further comprising a reinforcing material (E).

As an eighth aspect, the present invention relates to the water absorbing and releasing body for engine oil according to the seventh aspect, in which the reinforcing material (E) is a fiber.

As a ninth aspect, the present invention relates to the water absorbing and releasing body for engine oil according to the eighth aspect, in which the fiber is at least one fiber selected from the group consisting of a pulp, a cellulose fiber, a rayon fiber, a nylon fiber, a polyester fiber, a polypropylene fiber, an acrylic fiber, a vinylon fiber, an aramid fiber, an acetate fiber, and a glass fiber.

As a tenth aspect, the present invention relates to the water absorbing and releasing body for engine oil according to any one of the first aspect to the ninth aspect, further comprising a water-soluble organic solvent (F).

As an eleventh aspect, the present invention relates to the water absorbing and releasing body for engine oil according to the tenth aspect, in which the water-soluble organic solvent (F) is a nonvolatile water-soluble organic solvent.

As a twelfth aspect, the present invention relates to the water absorbing and releasing body for engine oil according to the eleventh aspect, in which the nonvolatile water-soluble organic solvent is at least one solvent selected from the group consisting of glycerin, diglycerin, ethylene glycol, and 1,3-butylene glycol.

As a thirteenth aspect, the present invention relates to the water absorbing and releasing body for engine oil according to any one of the first aspect to the twelfth aspect, in which the water absorbing and releasing body for engine oil is a sheet-like form.

As a fourteenth aspect, the present invention relates to an automotive part comprising the water absorbing and releasing body for engine oil as described in any one of the first aspect to the thirteenth aspect.

As a fifteenth aspect, the present invention relates to the automotive part according to the fourteenth aspect, in which the automotive part is an oil filter.

As a sixteenth aspect, the present invention relates to a method for producing a water absorbing and releasing body for engine oil comprising: a forming step (a) of forming an approximately-shaped water absorbing and releasing body product comprising a water-soluble organic macromolecule (A), a silicate (B), a dispersant (C) for the silicate, and at least one solvent selected from the group consisting of water and a water-soluble organic solvent (F).

As a seventeenth aspect, the present invention relates to the method for producing a water absorbing and releasing body for engine oil according to the sixteenth aspect, further comprising a desolventizing step (b) of removing a part of the solvent in the approximately-shaped water absorbing and releasing body product.

Effects of the Invention

The water absorbing and releasing body for engine oil according to the present invention (hereinafter, also described as "water absorbing and releasing body") has characteristics of absorbing water in engine oil (water absorbing property) and characteristics of releasing water when the engine oil has a high temperature of about 40° C. to about 120° C. (water releasing property).

The method for producing according to the present invention has an effect that the water absorbing and releasing body can be easily produced by mixing the water-soluble organic macromolecule (A), the silicate (B), the dispersant (C) of the silicate, and water or the water-containing solvent. The method for producing of the present invention also has an effect that the degree of the water absorbing property and the water releasing property of the water absorbing and releasing body can be controlled by adjusting the content of the solvent in the gel.

MODES FOR CARRYING OUT THE INVENTION

Figure 1:
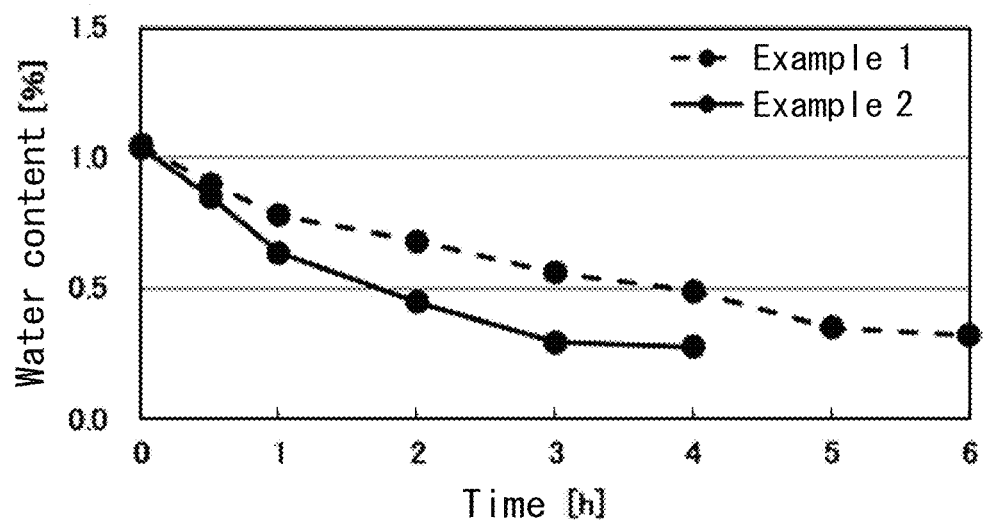
FIG. 1 is a graph illustrating change in a water content in engine oil in Example 3.

[Water Absorbing and Releasing Body for Engine Oil]

The water absorbing and releasing body of the present invention includes the water-soluble organic macromolecule (A), the silicate (B), and the dispersant (C) for the silicate, and includes if necessary, the water-absorbing macromolecule (D) and/or the reinforcing material (E), and one or more solvents selected form the group consisting of water and the water-soluble organic solvent (F). In addition to these components, other optional components may be added, if necessary, within a range not impairing the desired effect of the present invention.

<Component (A): Water-Soluble Organic Macromolecule>

The component (A) of the present invention is the water-soluble organic macromolecule and is preferably a water-soluble organic macromolecule having an organic acid structure, an organic acid salt structure, or an organic acid anion structure. The water-soluble organic macromolecule having the organic acid structure, the organic acid salt structure, or the organic acid anion structure has a plurality of organic acid groups such as carboxy groups, sulfonyl groups, and phosphonyl groups, or the salt structure or the anion structure of the organic acid groups as the side chains of the water-soluble organic macromolecule and is a water-soluble organic macromolecule freely dissolved into water.

Examples of the water-soluble organic macromolecule (A) having the organic acid structure, the organic acid salt structure, or the organic acid anion structure include carboxy group-containing macromolecules such as a poly(meth)acrylate, a salt of a carboxy vinyl polymer, and a salt of carboxymethyl cellulose; sulfonyl group-containing macromolecules such as a polystyrenesulfonate; and phosphonyl group-containing macromolecules such as a polyvinylphosphonate. Examples of the salt include a sodium salt, an ammonium salt, a potassium salt, and a lithium salt. The salt may be a fully neutralized salt or a partially neutralized salt.

In the present invention, (meth)acrylic acid means both acrylic acid and methacrylic acid.

The water-soluble organic macromolecule (A) may be a crosslinked product or a copolymerized product. Both a fully neutralized product in which all organic acid structures form salt structures or a partially neutralized product in which organic acid structures and organic acid salt structures exist in a mixed state can be used.

The weight average molecular weight of the water-soluble organic macromolecule (A) is preferably 1,000,000 to 10,000,000 and more preferably 2,000,000 to 7,000,000 measured by gel permeation chromatography (GPC) in terms of polyethylene glycol.

The weight average molecular weight of a commercially available water-soluble organic macromolecule (A) is preferably 1,000,000 to 10,000,000 and more preferably 2,000,000 to 7,000,000 as the weight average molecular weight described in the description of the commercially available product.

In the present invention, the water-soluble organic macromolecule (A) preferably has a carboxylic acid structure, a carboxylate structure, or a carboxylate anion structure and is more preferably a fully neutralized or partially neutralized polyacrylate. Specifically, the water-soluble organic macromolecule (A) is preferably a fully neutralized or partially neutralized sodium polyacrylate and particularly preferably a non-crosslinking-type highly polymerized fully neutralized or partially neutralized sodium polyacrylate having a weight average molecular weight of 2,000,000 to 7,000,000. The degree of neutralization of the partially neutralization is 10% to 90% and preferably 30% to 80%.

The content of the water-soluble organic macromolecule (A) is 0.01% by mass to 20% by mass and preferably 0.1% by mass to 10% by mass in 100% by mass of the water absorbing and releasing body.

<Component (B): Silicate>

The component (B) of the present invention is the silicate and preferably water-swellable silicate particles.

Examples of the silicate (B) include the water-swellable silicate particles such as smectite, bentonite, vermiculite, and mica. The silicate (B) is preferably a silicate that forms a colloid in which water or the water-containing solvent is used as a dispersion medium. The smectite is a generic term of clay minerals having a swelling property such as montmorillonite, beidellite, nontronite, saponite, hectorite, and stevensite.

Examples of the shapes of the primary particles of the silicate particles include disk-like, plate-like, sphere-like, grain-like, cube-like, needle-like, rod-like, and amorphous shapes. For example, the shape is preferably the disk-like shape having a diameter of 5 nm to 1,000 nm, or the plate-like shape. For example, LAPONITE XLG exemplified below has a disk-like shape having a diameter of 20 nm to 100 nm.

Specific examples of the preferable silicate include a layered silicate. Examples of easily available commercial products include LAPONITE XLG (synthesized hectorite), XLS (synthesized hectorite including sodium pyrophosphate as a dispersant), XL21 (sodium-magnesium-fluorosilicate), RD (synthesized hectorite), RDS (synthesized hectorite including inorganic polyphosphate as a dispersant), S482 (synthesized hectorite including a dispersant), and EP (organic modified hectorite) manufactured by BYK Additives & Instruments; Kunipia (registered trademark of KUNIMINE INDUSTRIES CO., LTD., montmorillonite), Sumecton (registered trademark of KUNIMINE INDUSTRIES CO., LTD.), SA (synthesized saponite), ST (synthesized stevensite), and SWF (synthesized hectorite) manufactured by KUNIMINE INDUSTRIES CO., LTD.; and BEN-GEL (registered trademark of HOJUN Co., Ltd., purified natural bentonite product) manufactured by HOJUN Co., Ltd.

The content of the silicate (B) is 0.01% by mass to 20% by mass and preferably 0.1% by mass to 15% by mass in 100% by mass of the water absorbing and releasing body.

<Component (C): Dispersant of Silicate>

The component (C) of the present invention is the dispersant of the silicate (B) and preferably the dispersant of the water-swellable silicate particles.

As the dispersant (C) of the silicate, a dispersant or a deflocculant can be used for the purpose of improving the dispersibility of the silicate or delaminating the layered silicate. For example, a phosphate-based dispersant, a carboxylate-based dispersant, a substance acting as an alkali, and an organic deflocculant can be used.

Examples of the dispersant (C) of the silicate include the phosphate-based dispersant such as a fully neutralized salt or partially neutralized salt of orthophosphoric acid, a fully neutralized salt or partially neutralized salt of pyrophosphoric acid, a fully neutralized salt or partially neutralized salt of tripolyphosphoric acid, a fully neutralized salt or partially neutralized salt of tetraphosphoric acid, a fully neutralized salt or partially neutralized salt of hexametaphosphoric acid, a fully neutralized salt or partially neutralized salt of polyphosphoric acid, and a fully neutralized salt or partially neutralized salt of etidronic acid (as the salts, sodium salts and the like are included); the carboxylate-based dispersant such as sodium poly(meth)acrylate, ammonium poly(meth)acrylate, a sodium acrylate/sodium maleate copolymer, and an ammonium acrylate/ammonium maleate copolymer; the substance acting as an alkali such as sodium hydroxide and hydroxylamine; a substance forming an insoluble salt or a complex salt reacting with polyvalent cations such as sodium carbonate and sodium silicate; and other organic deflocculant such as polyethylene glycol, polypropylene glycol, sodium humate, and sodium ligninsulfonate.

Among them, the phosphate-based dispersant, the carboxylate-based dispersant, and the other organic deflocculant are preferable, sodium pyrophosphate, sodium etidronate, a low polymerization sodium polyacrylate having a weight average molecular weight of 500 to 20,000, and polyethylene glycol having a weight average molecular weight of 500 to 20,000 (PEG 900 and the like) are more preferable, and a low polymerization sodium polyacrylate having a weight average molecular weight of 500 to 20,000 is the most preferable.

The low polymerization sodium polyacrylate has been known to act as the dispersant due to a mechanism of interacting with the silicate particles to generate negative charge derived from carboxylate anions on the surface of the particles and thus dispersing the silicate by the repulsion of the charge.

The content of the dispersant (C) is 0.001% by mass to 20% by mass and preferably 0.01% by mass to 10% by mass in 100% by mass of the water absorbing and releasing body.

When the silicate containing the dispersant is used as the component (B), the dispersant of the component (C) may or may not be further added.

<Component (D): Water-Absorbing Macromolecule>

The water absorbing and releasing body of the present invention may include the water-absorbing macromolecule as the component (D), whereby the water absorbing property can be improved. As such a water-absorbing macromolecule, a water-absorbing macromolecule having a crosslinking-type polycarboxylate structure or crosslinking-type polyvinylsulfonate is preferable and the water-absorbing macromolecule having the crosslinking-type polycarboxylate structure is more preferable.

Specific Examples of the water-absorbing macromolecule (D) include a crosslinking-type sodium polyacrylate, a crosslinking-type sodium polyvinylsulfonate, and a crosslinking-type copolymer of sodium acrylate and sodium vinylsulfonate, sodium styrenesulfonate, or sodium vinylphosphonate. Among them, the crosslinking-type sodium polyacrylate and the crosslinking-type sodium polyvinylsulfonate are preferable and the crosslinking-type sodium polyacrylate is more preferable.

Preferable examples of the crosslinking-type sodium polyacrylate include a powdery or granular product. The granular product having a grain diameter of 0.01 mm to 5 mm is preferable and the granular product having a grain diameter of 0.1 mm to 1 mm is more preferable.

Examples of the commercially available products of the water-absorbing macromolecule (D) include Aqualic (registered trademark) CA and Aqualic CS (manufactured by NIPPON SHOKUBAI CO., LTD.), Sumikagel (manufactured by Sumitomo Chemical Company, Limited), Lanseal (manufactured by TOYOBO CO., LTD.), Sanwet and Aquapearl (manufactured by San-Dia Polymers, Ltd.), KIGEL (manufactured by Kuraray Trading Co., Ltd.), Arasorb (manufactured by Arakawa Chemical Industries, Ltd.), and Aquakeep (manufactured by SUMITOMO SEIKA CHEMICALS CO., LTD.).

The water-absorbing macromolecule (D) can be used singly or in combination of two or more of them.

When the water absorbing and releasing body of the present invention includes the component (D), the content of the water-absorbing macromolecule (D) is 0.01% by mass to 20% by mass and preferably 0.1% by mass to 10% by mass in 100% by mass of the water absorbing and releasing body.

When the water-absorbing macromolecule (D) is included in an excessive amount, the strength of the water absorbing and releasing body of the present invention may be reduced due to relatively decreasing the amounts of the water-soluble organic macromolecule (A), the silicate (B), and the dispersant (C). The water-absorbing macromolecule (D) itself has a high water absorbing property and thus water in a solvent is absorbed at the time of producing the water absorbing and releasing body of the present invention. Consequently, each of the components may be difficult to mix.

<Component (E): Reinforcing Material>

The water absorbing and releasing body of the present invention may include the reinforcing material as the component (E).

In the present invention, the mechanical strength and the handling property of the water absorbing and releasing body can be improved by using the reinforcing material when the water absorbing and releasing body is processed into a sheet and thus the flexibility and the water absorbing performance of the water absorbing and releasing body can be retained.

Examples of the reinforcing material (E) include fibers. Examples of the fibers include a pulp, a cellulose fiber, a rayon fiber, a nylon fiber, a polyester fiber, a polypropylene fiber, an acrylic fiber, a vinylon fiber, an aramid fiber, an acetate fiber, and a glass fiber. Among them, the pulp is preferable.

The reinforcing material (E) can be used singly or in combination of two or more of them.

When the water absorbing and releasing body of the present invention includes the component (E), the content of the reinforcing material (E) is 0.1% by mass to 20% by mass and preferably 0.5% by mass to 10% by mass in 100% by mass of the water absorbing and releasing body.

<Component (F): Water-Soluble Organic Solvent>

The water absorbing and releasing body of the present invention may include the water-soluble organic solvent as the component (F).

The water-soluble organic solvent (F) is preferably a nonvolatile water-soluble organic solvent.

Examples of the nonvolatile water-soluble organic solvent include glycerin, diglycerin, ethylene glycol, and 1,3-butylene glycol and preferably include glycerin and diglycerin.

The water absorbing and releasing body of the present invention may further include a volatile water-soluble organic solvent. Examples of the volatile water-soluble organic solvent include methanol, ethanol, propanol, isopropyl alcohol, and acetone.

In the present invention, the water-soluble organic solvent may be used singly or in combination of two or more of them.

When the water absorbing and releasing body of the present invention includes the component (F), the content of the water-soluble organic solvent (F) is 0.5% by mass to 10% by mass and preferably 1.0% by mass to 5.0% by mass in 100% by mass of the water absorbing and releasing body.

<Other Additives>

The water absorbing and releasing body of the present invention may contain additives, if necessary, such as a surfactant and a preservative agent that play an auxiliary role with respect to a water absorbing function, strength, and processability when the water absorbing and releasing body is constituted, as long as the additives do not impair the effects of the present invention.

Examples of the surfactant include an anionic surfactant, a cationic surfactant, and a nonionic surfactant. The surfactant is preferably the anionic surfactant and more preferably a sodium alkylbenzene sulfonate and a sodium petroleum sulfonate.

The preservative agent is preferably phenoxyethanol and 1,3-butylene glycol.

Example of the preferable combination of the water-soluble organic macromolecule (A), the silicate (B), and the dispersant (C) of the silicate include a combination of 0.1% by mass to 10% by mass of the non-crosslinking-type highly polymerized fully neutralized or partially neutralized sodium polyacrylate having a weight average molecular weight of 2,000,000 to 7,000,000 as the component (A), 0.1% by mass to 15% by mass of water-swellable smectite or saponite as the component (B), and 0.01% by mass to 10% by mass of sodium pyrophosphate or 0.01% by mass to 10% by mass of a low polymerization sodium polyacrylate having a weight average molecular weight of 500 to 20,000 in 100% by mass of the water absorbing and releasing body.

When the water absorbing and releasing body of the present invention includes the component (D) and/or the component (E), examples of the preferable combination of the water-soluble organic macromolecule (A), the silicate (B), the dispersant (C) of the silicate, and the water-absorbing macromolecule (D) and/or the reinforcing material (E) include a combination of 0.1% by mass to 10% by mass of the non-crosslinking-type highly polymerized fully neutralized or partially neutralized sodium polyacrylate having a weight average molecular weight of 2,000,000 to 7,000,000 as the component (A), 0.1% by mass to 15% by mass of water-swellable smectite or saponite as the component (B), 0.01% by mass to 10% by mass of sodium pyrophosphate or 0.01% by mass to 10% by mass of low polymerization sodium polyacrylate having a weight average molecular weight of 500 to 20,000 as the component (C), and 0.1% by mass to 10% by mass of the crosslinking-type sodium polyacrylate and/or 0.5% by mass to 10% by mass of the pulp as the component (D) in 100% by mass of the water absorbing and releasing body.

The degree of the water absorbing property and the water releasing property of the water absorbing and releasing body of the present invention can be controlled by adjusting the content of at least one solvent selected from the group consisting of water and the water-soluble organic solvent (F). From the viewpoint of developing the water absorbing property and the water releasing property of the water absorbing and releasing body, the content of the solvent in the water absorbing and releasing body of the present invention is 50% by mass to 99% by mass, preferably 60% by mass to 98% by mass, and more preferably 70% by mass to 95% by mass.

A method for adjusting the content of the solvent in the water absorbing and releasing body is not particularly limited. Examples of the method include a method of removing the solvent in the water absorbing and releasing body described below.

[Method for Producing Water Absorbing and Releasing Body]

The method for producing the water absorbing and releasing body of the present invention includes a forming step of forming an approximately-shaped water absorbing and releasing body product including the water-soluble organic macromolecule (A), the silicate (B), the dispersant (C) for the silicate, and at least one solvent selected from the group consisting of water and the water-soluble organic solvent (F).

Examples of the method for forming the approximately-shaped water absorbing and releasing body product include a method for mixing each component of the water-soluble organic macromolecule (A), the silicate (B), and the dispersant (C) for the silicate and if necessary, the water-absorbing macromolecule (D), the reinforcing material (E), one or more solvents selected from the group consisting of water and the water-soluble organic solvent (F), and other additives, and allowing the resultant mixture to stand.

The method for mixing each component is not particularly limited. Examples of the method include a method for mixing the water-soluble organic macromolecule (A), the silicate (B), and the dispersant (C) for the silicate in a predetermined ratio and further adding the water-absorbing macromolecule (D), the reinforcing material (E), one or more solvents selected from the group consisting of water and the water-soluble organic solvent (F), and other additives, if desired, and mixing the resultant mixture or a method for previously preparing an aqueous solution of the water-soluble organic macromolecule (A) and an aqueous dispersion of the silicate (B) and the dispersant (C) for the silicate, adding the water-absorbing macromolecule (D), the reinforcing material (E) to the aqueous solution of the water-soluble organic macromolecule (A), if desired, thereafter mixing the aqueous dispersion of the silicate (B) and the dispersant (C) for the silicate with the resultant solution, and, in some cases, adding one or more water-soluble organic solvents at the time of mixing.

When each of the components in the aqueous solution or the aqueous dispersion is mixed, ultrasonic treatment can be used in addition to mechanical stirring or manual stirring. The mechanical stirring is preferable. In the mechanical stirring, a magnetic stirrer, a wing stirrer, a rotating/revolving mixer, a disper, a homogenizer, a shaker, a vortex mixer, a ball mill, a kneader, a line mixer, and an ultrasonic transmitter can be used. Among them, mixing with the magnetic stirrer, the wing stirrer, the rotating/revolving mixer, and the line mixer is preferable.

The temperature at the time of mixing the prepared liquids (the aqueous solution and the aqueous dispersion) is the freezing point to the boiling point of the aqueous solution or the aqueous dispersion, preferably $-5°$ C. to $100°$ C., and more preferably $0°$ C. to $50°$ C.

The mixture just after the mixing has weak strength in the form of sol. The approximately-shaped water absorbing and releasing body product, however, is formed by allowing the mixture to stand. The time for allowing to stand is preferably 2 hours to 100 hours. The temperature for allowing to stand is $-5°$ C. to $200°$ C. and more preferably $0°$ C. to $150°$ C. Any shape of the approximately-shaped water absorbing and releasing body product can be formed by pouring the mixture just after mixing into a petri dish, a vat, or a tray or extrusion molding and then allowing the mixture to stand. The thin film of the approximately-shaped water absorbing and releasing body product can be formed by application or spin coating.

The method for producing the water absorbing and releasing body of the present invention can also include a desolventizing step of removing a part of at least one solvent selected from the group consisting of water and the water-soluble organic solvent (F) in the approximately-shaped water absorbing and releasing body product obtained above. By including the desolventizing step, the degree of the water absorbing property and the water releasing property of the finally obtained water absorbing and releasing body can be controlled by adjusting the content of the solvent in the approximately-shaped water absorbing and releasing body product.

The content is 50% by mass to 99% by mass, preferably 60% by mass to 98% by mass, and more preferably 70% by mass to 95% by mass.

The method for removing the solvent is not particularly limited. Examples of the method include natural drying at room temperature, heating drying, and freeze drying.

The temperature at the time of drying is preferably −100° C. to 200° C. and more preferably −78° C. to 100° C.

The drying can be carried out under reduced pressure as well as normal pressure. The pressure is 0.1 kPa to 100 kPa and preferably 1 kPa to 100 kPa.

In the method for producing the water absorbing and releasing body of the present invention, the desolventizing is not necessarily carried out. The desolventizing is not required to be carried out when the approximately-shaped water absorbing and releasing body product already achieves the required water absorbing property and water releasing property at the time of forming the approximately-shaped water absorbing and releasing body product.

[Shape of Water Absorbing and Releasing Body]

The shape of the water absorbing and releasing body according to the present invention is not particularly limited as long as the shape can demonstrate the performance of absorbing water in engine oil and releasing water when the temperature of the engine oil is high. Examples of the shape include sphere-like (bead-like), fiber-like, rod-like, tube-like, sheet-like, and film-like shapes. Among them, the sheet-like shape is preferable from the viewpoint of effectively absorbing water in engine oil and effectively releasing water at high temperature of the engine oil. The water absorbing and releasing body may have a structure for increasing the surface area (for example, a thin film structure, an uneven structure, and a porous structure).

[Water Absorbing Performance Test of Water Absorbing and Releasing Body]

The water absorbing performance of the water absorbing and releasing body according to the present invention can be determined by a test using the engine oil to which water is previously added. Generally, the engine oil having a water content of 0.2% or higher results in a white turbid state due to emulsification. On the other hand, when the water content of the engine oil reaches to less than 0.2%, the white turbidity disappears and the engine oil becomes clear. For example, the water absorbing and releasing body is immersed into the engine oil containing 1% to 10% of water and the engine oil is stirred or circulated at the predetermined temperature (40° C. to 60° C.). The water absorbing performance can be determined from the time until the white turbidity disappears. In addition to visually observing the disappearance of the white turbidity, the water amount can be determined by Karl Fisher water measurement or measurement of the mass change by evaporating water using a heat drying method.

[Water Releasing Performance of Water Absorbing and Releasing Body]

The water releasing performance of the water absorbing and releasing body according to the present invention can be determined by, for example, a water retention rate (%) of the water absorbing and releasing body. For example, the water absorbing and releasing body to which water is previously absorbed is immersed into the engine oil maintained at the predetermined temperature (40° C. to 120° C.) to measure the mass of the water absorbing and releasing body after a certain period of time. The percentage calculated by dividing the mass of the water absorbing and releasing body after immersion by the mass of the water absorbing and releasing body before immersion is determined to be the water retention rate [Water retention rate (%)=(Mass of water absorbing and releasing body after immersion)/(Mass of the water absorbing and releasing body before immersion)×100(%)], whereby the water releasing performance can be determined.

[Automotive Parts]

The automotive parts including the water absorbing and releasing body of the present invention is also included in the present invention.

Such automotive parts are not particularly limited as long as the water absorbing property and/or the water releasing property are required for the parts. Examples of the parts include an engine and specific examples include an oil filter.

The water absorbing and releasing body according to the present invention has durability over a wide temperature range in the automotive use that is used under harsh conditions. For example, the water absorbing and releasing body according to the present invention has small shape change even when the water absorbing and releasing body freezes at −40° C. and hardly deteriorates the absorbing and releasing function even when the water absorbing and releasing body is exposed at a high temperature of 130° C. for 200 hours. The water absorbing and releasing body also has durability to strong acids such as nitric acid and sulfuric acid generated from NOx and SOx and water in exhaust gas. Therefore, even when the water absorbing and releasing body is processed in the form of a sheet, the sheet does not disintegrate and the water absorbing and releasing function hardly deteriorates.

The water absorbing and releasing body according to the present invention has the controlling function of water absorption and release depending on temperature. The water in the water absorbing and releasing body is released by raising temperature of the engine oil and discharged to outside of a vehicle as water vapor together with the exhaust gas. The water absorbing and releasing body after releasing water can absorb water again and can be repeatedly used. By these properties, the performance of the engine oil can be maintained for a long period of time.

Consequently, the water absorbing and releasing body according to the present invention has effects of absorbing water in the engine oil under harsh conditions in the oil filter and releasing water when the temperature of the engine oil is high.

The water absorbing and releasing body according to the present invention has an effect of having stiffness (flexibility) in such a degree that the shape of the water absorbing and releasing body can be retained without a support such as a container. Consequently, the water absorbing and releasing body according to the present invention is durable for deformation such as folding, can be processed by a cutting process, and can be used without being covered with a nonwoven fabric and the like. In addition, the water absorbing and releasing body according to the present invention can be a water absorbing and releasing body retaining flexibility after drying by adding the nonvolatile water-soluble organic solvent at the time of production.

In other words, the water absorbing and releasing body according to the present invention provides the oil filter with mechanical strength applicable to the oil filter and the excellent water absorbing characteristics and water releasing characteristics and thus the water absorbing and releasing body can be especially suitably used for the member of the oil filter.

The water absorbing and releasing body according to the present invention includes the water-absorbing macromolecule (D), whereby the absorbing property of the water in the engine oil can be improved, and includes the reinforcing material (E), whereby the mechanical strength can be improved. In other words, the water absorbing and releasing body according to the present invention can be more suitably used for the oil filter by including the water-absorbing macromolecule (D) and/or the reinforcing material (E).

EXAMPLES

Subsequently, the contents of the present invention will be specifically described with reference to Examples. The present invention, however, is not limited to these Examples.

Production Example 1: Production of 20% LAPONITE XLG Aqueous Dispersion

First, 7.5 parts of 20% disodium etidronate aqueous solution (CHELEST PH-212: manufactured by CHELEST CORPORATION), 0.5 part of phenoxyethanol (manufactured by JUNSEI CHEMICAL CO., LTD.), and 72 parts of water were mixed and the resultant mixture was stirred at 25° C. until the mixture turned into a homogeneous solution. To this solution, 20 parts of LAPONITE XLG (manufactured by BYK Additives & Instruments) was added little by little. The temperature of the resultant mixture was raised to 80° C. while the mixture was vigorously stirred and the mixture was continued to stir at 80° C. for 30 minutes. Thereafter, the mixture was cooled to 25° C. in an ice bath to give a target product.

Production Example 2: Production of 2% Sodium Polyacrylate Aqueous Solution

While 98 parts of water was vigorously stirred, 2 parts of highly polymerized sodium polyacrylate (ARONVIS MX: manufactured by TOAGOSEI CO., LTD., weight average molecular weight 2,000,000 to 3,000,000) was added little by little. Thereafter, the resultant mixture was vigorously stirred at 25° C. until the mixture was completely dissolved (about 5 hours) to give a target product.

Example 1: Production of Water Absorbing and Releasing Sheet 1

First, 48.2 parts of the 2% sodium polyacrylate aqueous solution produced in Production Example 2, 48.2 parts of water, and 1.2 parts of glycerin were charged and the resultant mixture was vigorously stirred until the mixture became homogeneous. The resultant solution was cooled under ice cooling and 2.4 parts of 20% LAPONITE XLG aqueous dispersion produced in Production Example 1 was added to the solution. The resultant mixture was vigorously stirred for 1 minute. The stirred mixture was poured into a stainless-steel tray and dried in an oven of 80° C. for 15 hours to give a water absorbing and releasing sheet 1.

Example 2: Production of Water Absorbing and Releasing Sheet 2

First, 49.9 parts of water and 1.1 parts of glycerin were added to 0.7 part of a grinded oil filter containing a pulp material and the pulp material was dispersed while the mixture was stirred. To this mixture, 43.5 parts of the 2% sodium polyacrylate aqueous solution produced in Production Example 2 was added and the resultant mixture was vigorously stirred until the mixture became homogenous. Next, 0.4 part of Aqualic CA (manufactured by NIPPON SHOKUBAI CO., LTD.), and then 2.2 parts of the engine oil (Castle SN 0W-16: manufactured by TOYOTA MOTOR CORPORATION) were sequentially added. The resultant mixture was vigorously stirred until the mixture became homogeneous. The resultant solution was cooled under ice cooling and 2.2 parts of 20% LAPONITE XLG aqueous dispersion produced in Production Example 1 was added to the solution. The resultant mixture was vigorously stirred for 1 minute. The stirred mixture was poured into a stainless-steel tray and dried in an oven of 80° C. for 15 hours to give a water absorbing and releasing sheet 2.

Example 3: Water Absorption Test of Water Absorbing and Releasing Body

To 44.5 g of the engine oil (Castle SN 0W-16: manufactured by TOYOTA MOTOR CORPORATION), 0.5 g of water was added and the resultant mixture was stirred at 2,000 rpm for 2 hours. The sheet produced in Example 1 having a size of 5 cm×5 cm was immersed into the water-containing oil and the oil was stirred at 40° C. at 2,000 rpm until the white turbidity of the oil disappeared. On the way, sampling was carried out at every predetermined time. The water amount was measured by a heat drying method (drying at 120° C. for 1 hour). The white turbidity disappeared after 6 hours in the case of the sheet in Example 1 and after 4 hours in the case of the sheet in Example 2 to which the water-absorbing macromolecule was added. FIG. 1 illustrates change in the water content in the engine oil at every measured time.

Example 4: Water Release Test of Water Absorbing and Releasing Body

Each of three pieces of the water absorbing and releasing sheet 1 (5 g) in Example 1 was immersed into water at room temperature for 12 hours to absorb water to the limit. Thereafter, the sheet was immersed into 500 cc of the engine oil (Castle SN 0W-16: manufactured by TOYOTA MOTOR CORPORATION) maintaining each temperature of 40° C., 80° C., and 120° C. The mass of the water absorbing and releasing sheet 1 after a certain period of time was measured to determine the water retention rate (%) in the water absorbing and releasing sheet 1.

The water retention rate (%) is calculated by the following formula.

Water retention rate (%)=(Mass of water absorbing and releasing sheet 1 after immersion into engine oil)/(Mass of water absorbing and releasing sheet 1 before immersion into engine oil)×100(%)

The results of the water release test of the water absorbing and releasing sheet are listed in Table 1. As the temperature of the engine oil became higher, the water retention rate of the water absorbing and releasing sheet became lower. Therefore, it was shown that the water absorbing and releasing body of the present invention has the water releasing characteristics.

TABLE 1

| Elapsed time (hour) | Water retention rate (%) | | |
| --- | --- | --- | --- |
| | 40° C. | 80° C. | 120° C. |
| 0 | 100 | 100 | 100 |
| 2 | 87 | 82 | 67 |

TABLE 1-continued

| | Water retention rate (%) | | |
|---|---|---|---|
| Elapsed time (hour) | 40° C. | 80° C. | 120° C. |
| 4 | 82 | 79 | 52 |
| 20 | 61 | 52 | 12 |
| 24 | 55 | 42 | 9 |

Example 5: Actual Vehicle Test of Water Content in Engine Oil

Figure 2:
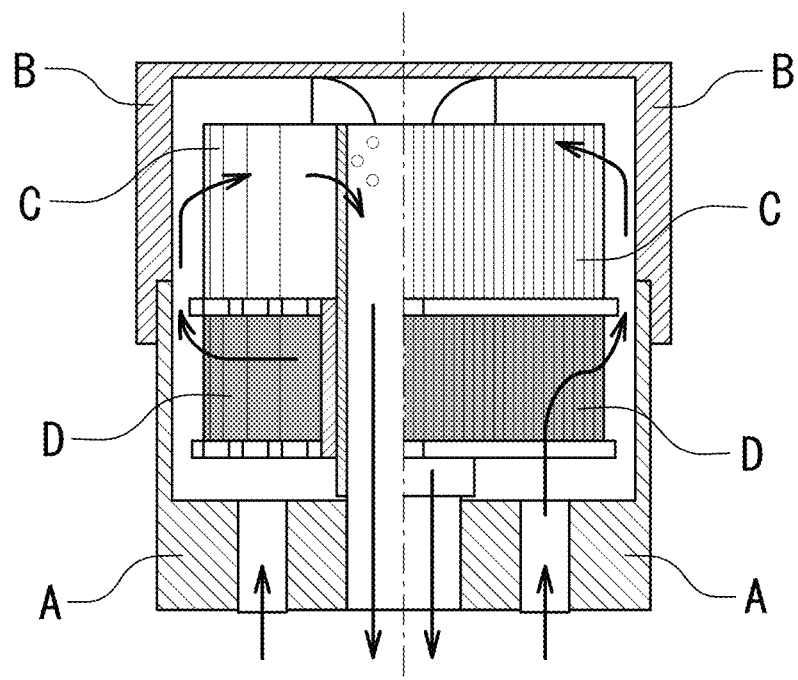
FIG. 2 is a one side sectional view of a part of an oil filter used in Example 5.

In order to simulate the use of the water absorbing and releasing sheet in a cold region, cold start at −10° C. was repeatedly carried out in a state where the water absorbing and releasing sheet 2 in Example 2 (the sheet having a shape like chrysanthemum flower formed by folding a sheet having a thickness of 1 mm and an area of 160 cm$^2$) was placed in the upstream of the oil filter (FIG. 2) to measure the water content (%) in the engine oil. In FIG. 2, arrows indicate the flow of the engine oil.

The water content (%) in the engine oil was measured using Karl Fisher water measurement apparatus (compliant with JIS K 0113: 2005) manufactured by HIRANUMA SANGYO Co., Ltd.

Figure 3:
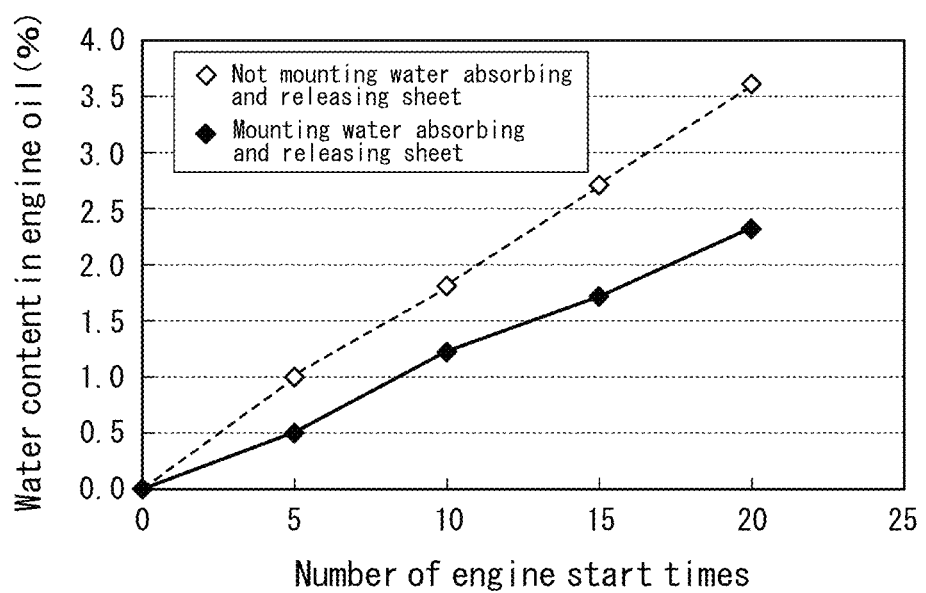
FIG. 3 is a graph illustrating results of an actual vehicle test in Example 5.

The results of the actual vehicle test are listed in Table 2 and illustrated in FIG. 3. An increase in the water content in the engine oil was reduced by mounting the water absorbing and releasing sheet of the present invention. Specifically, as the number of engine start times was increased, the difference between the water content in the engine oil in the actual vehicle in the presence of the mounted water absorbing and releasing sheet (Mounting water absorbing and releasing sheet_) of the present invention and the water content in the actual vehicle in the absence of the mounted water absorbing and releasing sheet ('Not mounting water absorbing and releasing sheet_) became larger. In the case that the number of engine start times was 20 times, the water content (2.3%) in the engine oil in the actual vehicle in the presence of the mounted water absorbing and releasing sheet of the present invention was 1.3% lower than the water content in the actual vehicle in the absence of the mounted water absorbing and releasing sheet (3.6%).

Consequently, it was shown that the water absorbing and releasing body of the present invention also has the water absorbing characteristics even under actual vehicle environment.

TABLE 2

| | Water content in engine oil (%) | |
|---|---|---|
| Number of engine start times | Not mounting water absorbing and releasing sheet | Mounting water absorbing and releasing sheet |
| 0 | 0 | 0 |
| 5 | 0.9 | 0.5 |
| 10 | 1.8 | 1.1 |
| 15 | 2.7 | 1.7 |
| 20 | 3.6 | 2.3 |

DESCRIPTION OF THE REFERENCE NUMERALS

A Housing
B Cap
C Oil Filter
D Water Absorbing and Releasing Sheet

INDUSTRIAL APPLICABILITY

The water absorbing and releasing body for engine oil of the present invention can effectively absorb water in engine oil and release the water when the temperature of the engine oil is high, has flexibility, and can be processed by a cutting process and thus can be particularly used as the member of a filter for an engine, utilizing its characteristics.

The invention claimed is:

1. An oil filter comprising a water absorbing and releasing body for engine oil, the water absorbing and releasing body comprising:
   a water-soluble organic macromolecule in an amount of from 0.1% by mass to 10% by mass, based on 100% by mass of the absorbing and discharging body;
   a silicate in an amount of 0.1% by mass to 15% by mass, based on 100% by mass of the absorbing and discharging body;
   a dispersant for the silicate in an amount of from 0.1% by mass to 10% by mass, based on 100% by mass of the absorbing and discharging body;
   a water-absorbing macromolecule in an amount of from 0.01% by mass to 20% by mass, based on 100% by mass of the absorbing and discharging body; and
   a reinforcing material;
   wherein the water absorbing and releasing body has been adapted for absorbing water in engine oil and releasing water when the engine oil has a temperature of about 40° C. to about 120° C., and wherein
   the water-soluble organic macromolecule is a fully neutralized or partially neutralized polyacrylate having a weight average molecular weight of 1,000,000 to 10,000,000,
   the silicate is at least one of water-swellable silicate particles selected from the group consisting of smectite, bentonite, vermiculite, and mica,
   the dispersant is at least one substance selected from the group consisting of a fully neutralized salt or partially neutralized salt of orthophosphoric acid, a fully neutralized salt or partially neutralized salt of pyrophosphoric acid, a fully neutralized salt or partially neutralized salt of tripolyphosphoric acid, a fully neutralized salt or partially neutralized salt of tetraphosphoric acid, a fully neutralized salt or partially neutralized salt of hexametaphosphoric acid, a fully neutralized salt or partially neutralized salt of polyphosphoric acid, a fully neutralized salt or partially neutralized salt of etidronic acid, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, and sodium lignin,
   the water-absorbing macromolecule is at least one substance selected from the group consisting of a crosslinking-type polyacrylate and a crosslinking-type polyvinylsulfonate, and
   the reinforcing material is a fiber, and the fiber is a pulp wherein the pulp is obtained from a grinded oil filter.

2. The oil filter according to claim 1, further comprising a water-soluble organic solvent.

3. The oil filter according to claim 2, wherein the water-soluble organic solvent is a nonvolatile water-soluble organic solvent.

4. The oil filter according to claim 3, wherein the nonvolatile water-soluble organic solvent is at least one solvent selected from the group consisting of glycerin, diglycerin, ethylene glycol, and 1,3-butylene glycol.

5. The oil filter according to claim 1, wherein the water absorbing and releasing body for engine oil is a sheet-like form.

6. The oil filter according to claim 1, wherein the water-absorbing macromolecule is a crosslinking-type polyacrylate having a grain diameter of 0.01 mm to 5 mm.

7. The oil filter according to claim 6, wherein the grain diameter 0.1 mm to 1 mm.

* * * * *